US006751751B1

(12) United States Patent
Murray et al.

(10) Patent No.: US 6,751,751 B1
(45) Date of Patent: Jun. 15, 2004

(54) UNIVERSAL MULTI-BUS BREAKPOINT UNIT FOR A CONFIGURABLE SYSTEM-ON-CHIP

(75) Inventors: James Murray, Mountain View, CA (US); Jean-Didier Allegrucci, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 571 days.

(21) Appl. No.: 09/707,459

(22) Filed: Nov. 6, 2000

(51) Int. Cl.⁷ .................................................. G06F 11/00
(52) U.S. Cl. ........................................... 714/34; 710/15
(58) Field of Search ............................... 714/34, 39, 40, 714/43, 44, 47, 56, 37; 710/15, 17–19, 48, 49, 47

(56) References Cited

U.S. PATENT DOCUMENTS

| | | | |
|---|---|---|---|
| 5,012,180 A | | 4/1991 | Dalrymple et al. |
| 5,047,926 A | | 9/1991 | Kuo et al. |
| 5,367,550 A | | 11/1994 | Ishida |
| 5,572,667 A | | 11/1996 | Ideta |
| 5,717,851 A | | 2/1998 | Yishay et al. |
| 5,724,505 A | | 3/1998 | Argade et al. |
| 5,737,516 A | | 4/1998 | Circello et al. |
| 5,793,776 A | | 8/1998 | Quershi et al. |
| 5,812,562 A | | 9/1998 | Baeg |
| 5,875,294 A | | 2/1999 | Roth et al. |
| 5,896,415 A | | 4/1999 | Owens et al. |
| 5,915,083 A | | 6/1999 | Ponte |
| 6,026,501 A | | 2/2000 | Hohl et al. |
| 6,134,652 A | * | 10/2000 | Warren .......................... 712/227 |
| 6,331,957 B1 | * | 12/2001 | Kurts et al. .................. 365/201 |
| 6,345,298 B1 | * | 2/2002 | Moriya ........................ 709/228 |
| 6,351,724 B1 | * | 2/2002 | Klassen et al. ............. 702/186 |
| 6,408,412 B1 | | 6/2002 | Rajsuman |
| 6,425,101 B1 | | 7/2002 | Garreau |
| 6,430,727 B1 | * | 8/2002 | Warren ........................... 716/4 |
| 6,457,108 B1 | | 9/2002 | Hsu et al. |
| 6,467,009 B1 | | 10/2002 | Winegarden et al. |
| 6,522,985 B1 | | 2/2003 | Swoboda et al. |
| 6,557,116 B1 | | 4/2003 | Swoboda et al. |
| 6,598,178 B1 | * | 7/2003 | Yee et al. ...................... 714/34 |

FOREIGN PATENT DOCUMENTS

EP         0 636 976 A1      7/1994

OTHER PUBLICATIONS

IBM Technical Disclosure Bulletin, "Efficient Mechanism for Multiple Debug Modes," vol. 38, No. 11, Nov. 1995, pp. 65–68.
IEEE Standard Test Access Port and Boundary–Scan Architecture, IEEE Std. 1149.1–1990, IEEE Computer Society, Oct. 21, 1993, pp. 1–166.
Supplement to IEEE Std. 1149.1–11990, IEEE Standard Test Access Port and Boundary–Scan Architecture, IEEE Std. 1149.1n–1994, IEEE Computer Society, Mar. 3, 1995, pp. 1–75.

* cited by examiner

*Primary Examiner*—Nadeem Iqbal
(74) *Attorney, Agent, or Firm*—Judith A. Szepesi; Kim Kanzaki; Justin Liu

(57) ABSTRACT

The present invention provides a hardware breakpoint unit for a multibus, processor-based, configurable circuit. The multi-bus breakpoint unit connects to and allows tracing of multiple busses and includes the ability to break on the occurrence of a pre-determined bus event on any one of the multiple busses. The multi-bus breakpoint unit can be connected to and programmed by a host debugging system via a port on the target chip.

25 Claims, 5 Drawing Sheets

UNIVERSAL MULTI-BUS BREAKPOINT UNIT FOR A CONFIGURABLE SYSTEM-ON-CHIP

FIELD OF THE INVENTION

The present invention relates to integrated circuits, and more specifically a hardware breakpoint unit for tracing bus events in a multi-bus system.

BACKGROUND

Advances in integrated circuit technology have made it possible to embed an entire system, including a processor core, a memory unit, a high performance bus, and a programmable logic, in a single semiconductor device. This type of programmable semiconductor device is commonly referred to as a system-on-chip (SoC), or a configurable system-on-chip (CSoC). The SoC provides many advantages over traditional processor-based designs. It is an attractive alternative to multi-chip designs because the integration of components into a single device increases overall speed while decreasing size. The SoC is also an attractive alternative to fully customized chips, such as an ASIC (application specific integrated circuit), because ASIC designs tend to have a significantly longer development time and larger development costs.

While the integration of components into a single chip provides many advantages, it often makes debugging chip firmware more difficult. Many of the methods and tools commonly used for debugging processor-based, embedded systems are less effective or simply do not work when the processor is deeply embedded in a chip. For example, logic analyzers and ICEs (in circuit emulators) are often ineffective tools for tracing bus events when the processor's address and data busses are not available externally on the chip's I/O (input/output) pins.

The lack of external access to address and data busses has led processor designers to develop on-chip debugging solutions. By adding debug logic to the processor core and making it accessible externally via a serial port, chip designers have made it possible to remotely control execution of a processor with minimal use of the target chip's resources, such as ROM and I/O pins. However, this solution only allows tracing of a processor's local bus.

New and complex SoCs are being developed with multiple processors and multiple busses. New SoC designs have a dedicated processor bus, connecting the processor core to on-chip memory, as well as a peripheral bus, connecting the application specific or programmable logic portion of the chip to the processor core. Prior art solutions do not address such multi-bus systems.

SUMMARY

A breakpoint unit for a configurable system-on-chip with multiple busses is disclosed. The breakpoint unit is coupled to the busses and able to break on a specified bus event on a selected bus.

Other advantages, features, and objectives of the present invention will be apparent from the drawings and the detailed description that follow.

DETAILED DESCRIPTION

The present invention provides a hardware breakpoint unit for a multi-bus, processor-based, configurable circuit. The multi-bus breakpoint unit connects to and allows tracing of multiple busses and includes the ability to break on the occurrence of a pre-determined bus event on any one of the multiple busses. The multi-bus breakpoint unit may be connected to and programmed by a host debugging system via a port on the target chip.

Figure 1:
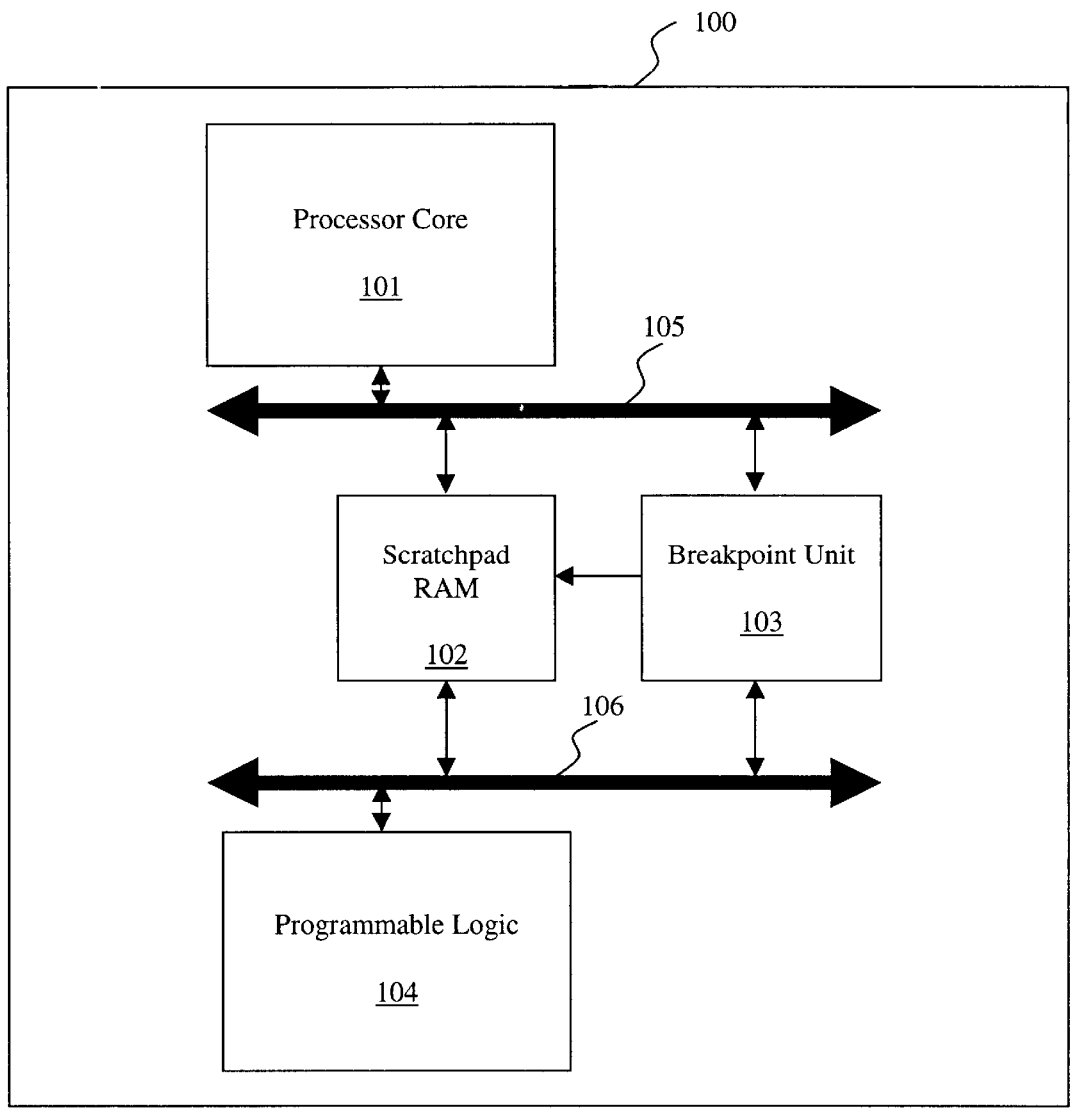
FIG. 1 is a block diagram of one embodiment of a configurable system-on-chip with a multi-bus breakpoint unit.

FIG. 1 is a block diagram of one embodiment of a configurable-system-on-chip 100 with an embedded multi-bus breakpoint unit 103. The breakpoint unit's primary advantage over prior art is that it can be connected to and detect events on multiple busses 105, 106. The breakpoint unit 103 is coupled to a processor 101 by a local processor bus 105 and coupled to a programmable logic 104 by a peripheral bus 106. While the breakpoint unit 103 shown in FIG. 1 is connected to only two busses 105, 106, one skilled in the art will recognize that the breakpoint unit 103 may easily be implemented to work with more than two busses of varying widths.

The programmable logic block 104 makes the system-on-chip configurable and may be a FPGA (field programmable gate array) or some other form of programmable logic. In an alternative embodiment, non-programmable logic could be substituted. For example, a second processor such as a DSP (digital signal processor) could be used in place of the programmable logic block 104.

The scratchpad RAM (random access memory) 102 is a general purpose read and write memory that is used as a trace buffer to capture bus events. The breakpoint unit 103 can be configured to write to the scratchpad RAM 102 on all bus cycles, all valid bus cycles, or specific cycles such as those associated with a DMA (direct memory access) transfer or certain CPU activity, like an instruction fetch. Also, the breakpoint unit 103 can be configured to capture bus events before and after the detection of a specified breakpoint condition. Trace buffer functionality and features are described in further detail below.

Figure 2:
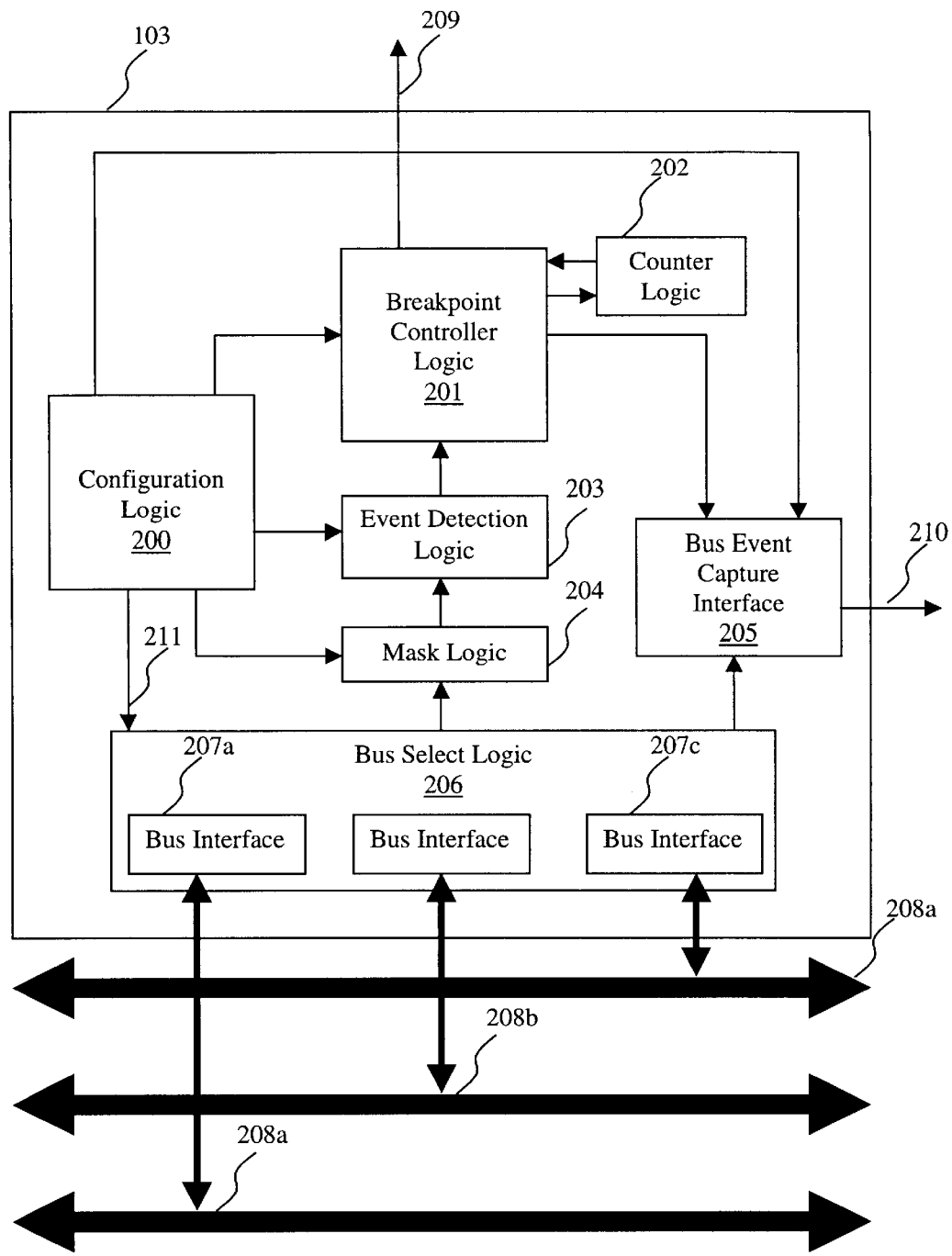
FIG. 2 is a block diagram of one embodiment of a multi-bus breakpoint unit.

FIG. 2 is a block diagram of one embodiment of a multi-bus breakpoint unit 103 divided into functional or logical blocks. Three busses 208a, 208b, and 208c, are connected to the breakpoint unit 103 to illustrate how the breakpoint unit 103 is implemented to work with more than two busses.

The configuration logic 200 includes programmable configuration registers (not shown), which give the breakpoint unit 103 a flexible programming interface. The configuration logic 200 generates the control signals that determine how the breakpoint unit 103 functions. The programming of the configuration logic 200 controls among other things the selection of the bus to be traced, the masking pattern of the selected bus, the breakpoint condition that will trigger a breakpoint event, and the resulting output signal(s) 209 for a breakpoint event. The configuration logic 200 can be programmed by a local processor or by a host debugging system connected to the configurable system-on-chip.

The bus select logic 206 has bus interfaces 207a, 207b, and 207c, at which the busses 208a, 208b, and 208c connect to the breakpoint unit 103. The bus select logic 206 serves as a filter, allowing only one of the connected busses 208a, 208b, or 208c to pass through to the mask logic 204. The bus select signal 211 determines which bus is selected by the bus select logic 206. For one embodiment, the bus select signal 211 is generated by the configuration logic 200. Data from the selected bus is then output by the bus select logic 206 to the mask logic 204. In one embodiment, a breakpoint unit 103 with three busses would require a two-bit bus select signal 211. For example, if the bus select signal 211 were 00, then bus 0 would be selected and output to the mask logic. If the bus select signal were 01, bus 1 would be selected, and so forth.

The mask logic 204 masks the selected bus data before it is passed on to the event detection logic 203. Masking the selected bus data allows for greater flexibility in setting breakpoint conditions. One use of masking is for detecting the occurrence of an address within a particular range of addresses. For example, if 8 bits of a bus represent an address such that the address range is from 00000000 to 11111111, then 1100XXXX, where X is a masked bit, represents a range of addresses from 11000000 to 11001111. Therefore, if the bus is masked, a breakpoint condition that falls within the address range 11000000 to 11001111 will generate a breakpoint event. Without masking the bus, the breakpoint condition must exactly match the bus event in order for a breakpoint event to result.

A programmable mask register (not shown) determines how the mask logic 204 masks the selected bus. For one embodiment, the programmable mask register is located in the configuration logic 200. A single mask register and mask logic 204 are used for one embodiment. For another embodiment, the mask logic 204 may work with multiple mask registers resulting in even greater flexibility in defining breakpoint conditions.

The event detection logic 203 compares the bits of the bus selected by the bus select logic 206 and masked by the mask logic 204 to the programmed breakpoint conditions. The event detection logic 203 can be implemented to work with and detect multiple breakpoint conditions. When a masked bus event matches a programmed breakpoint condition, the event detection logic 203 generates a signal that is output to the breakpoint controller logic 201 indicating that a breakpoint condition has been detected.

Detection of a breakpoint condition does not always result in a breakpoint event. For one embodiment, the breakpoint controller logic 201 controls when a breakpoint condition results in a breakpoint event based on the programming of the configuration registers. The breakpoint controller logic 201 may be configured to break on the first detection of a breakpoint condition or only after a breakpoint condition has been detected a certain number of times. The counter logic 202, which works in conjunction with the breakpoint controller logic 201, is used to count the number of times a breakpoint condition is detected. Configuration registers may be programmed with count values, that, when matched, generate breakpoint events. For one embodiment, multiple counter values and counters 202 are used. For one embodiment, each counter 202 is associated with a breakpoint condition and each counter 202 counts the number of times that particular breakpoint condition is detected. The breakpoint unit 103 may be configured to break when one counter 202 reaches a specified value, when all counters 202 reach a specified value, when any counter 202 reaches a specified value, or a combination of these events occur.

The breakpoint controller logic 201 also controls what happens as the result of a breakpoint event. The breakpoint controller logic 201 may be configured to generate one or more output signals upon a breakpoint event. The output signal(s) 209 may be used to interrupt or freeze a processor, depending on the processor's supported features. Alternatively, a breakpoint event may result in the configurable system logic clock (not shown) being blocked, or the bus arbiter (not shown) being frozen. If the output signal 209 is routed externally via the I/O pins of the chip, an external host debugging system may also make use of the signal.

The bus event capture interface 205 is used to route bus events for storage. For one embodiment, signal 210, the output of the bus event capture interface 205, may be connected to a scratchpad RAM (not shown) and bus events may be stored in the scratchpad RAM for later use.

Figure 3:
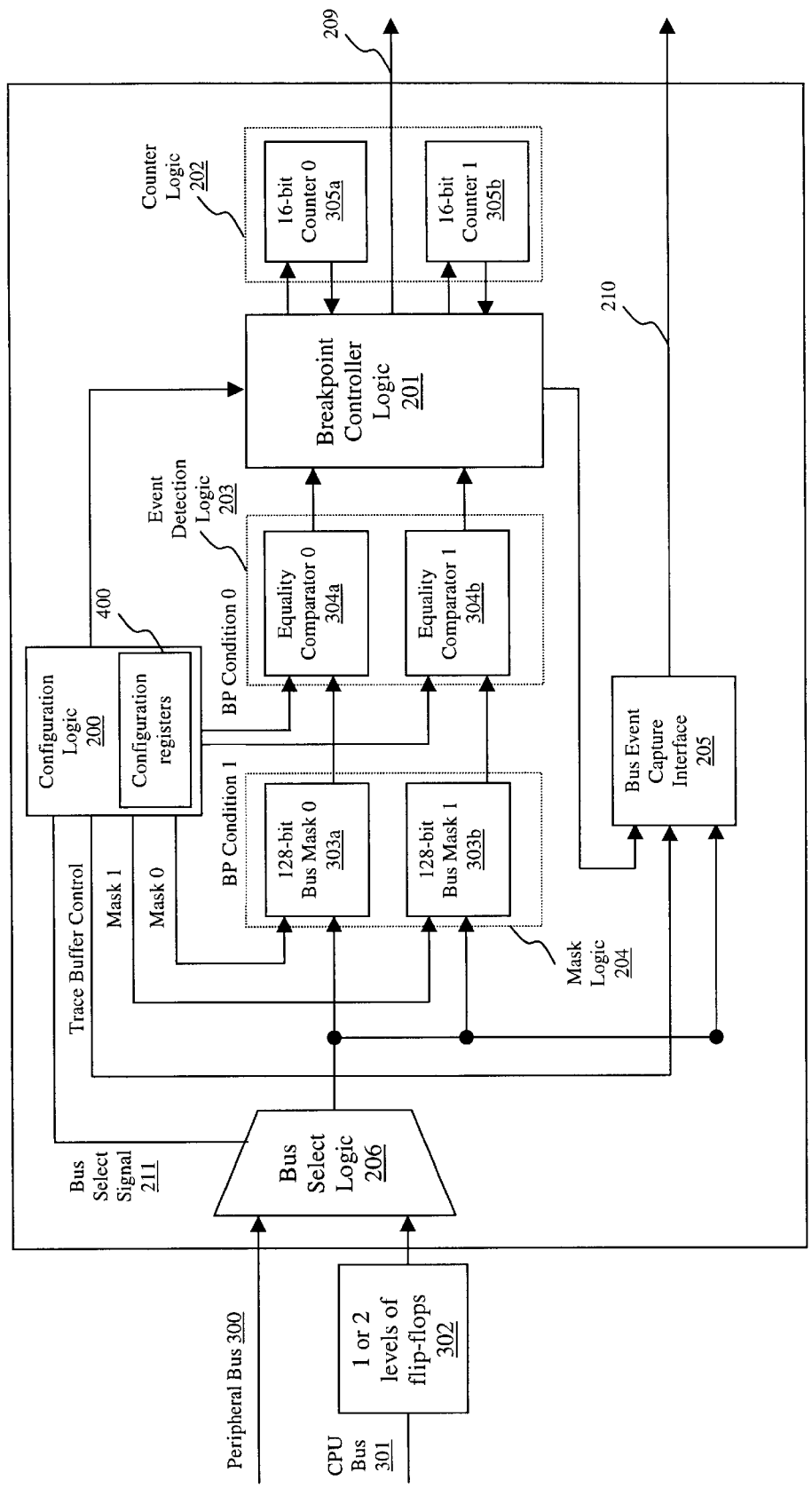
FIG. 3 is a circuit logic diagram of one embodiment of a multi-bus breakpoint unit.

FIG. 3 is a circuit diagram of one embodiment of a multi-bus breakpoint unit 103. The breakpoint unit 103 shown in FIG. 3 is designed for use in a CSoC with an ARM7TDMI processor core, a programmable logic block, and two 128-bit busses. For one embodiment, the ARM7TDMI processor's local bus is buffered using one or more levels of flip-flops 302 because the ARM7TDMI's bus timing does not allow the actual bus to be monitored. Both the peripheral bus 300 and the processor bus 301 are coupled to the breakpoint unit 103 at the bus select logic 206. The bus select signal 211, which is generated based on the programming of the configuration registers 400, determines which bus is selected for monitoring.

Figure 4:
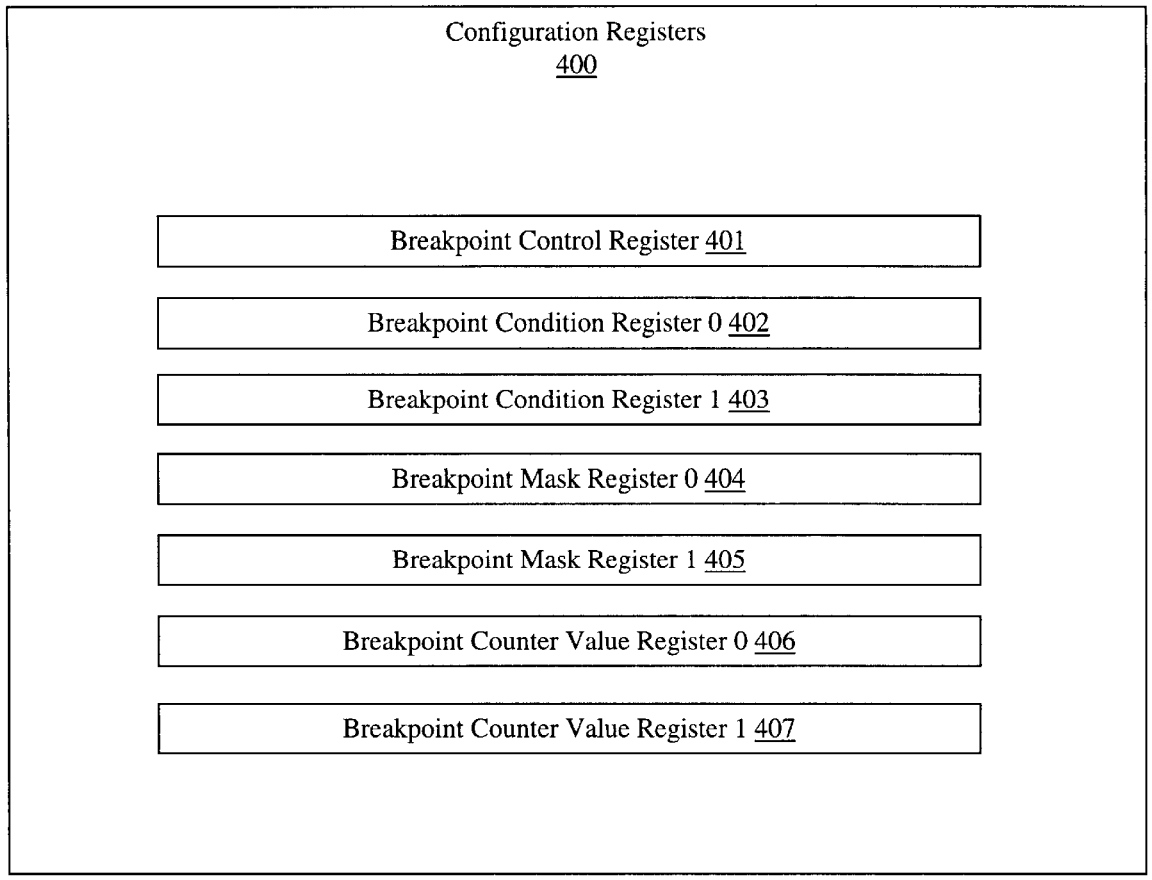
FIG. 4 is a diagram of one embodiment of the configuration logic block showing the individual configuration registers.

The configuration registers 400, shown in more detail in FIG. 4, include a control register 401 used to configure the basic functionality of the breakpoint unit 103. For one embodiment the control register 401 determines what output signal is sent to the CPU, configurable system logic clock (not shown), and bus arbiter (not shown) as a result of each breakpoint event. For one embodiment, the control register 401 determines the mode of the breakpoint counters, the bus selection, and the tracing mode. For one embodiment, there may be multiple control registers 401, for different breakpoints.

The configuration registers 400 also include breakpoint condition registers 402 and 403 allowing breakpoint conditions to be specified. The configuration registers 400 also include bus masking registers 404 and 405 to specify separate masking patterns for each individual breakpoint condition. Finally, the configuration logic has counter registers 406 and 407 used to control the number of detections required to result in a breakpoint event. Note that although two registers of each type are shown, there could be any number of registers of each type.

Referring again to FIG. 3, after the bus select logic 206 selects a bus, for one embodiment, the selected bus is split in two and routed to the mask logic 204. The mask logic 204 in this embodiment is implemented as two separate blocks 303a and 303b. Each mask block, bus mask 0 303a and bus mask 1 303b, masks the selected bus with the masking pattern programmed into its respective mask register, mask register 0 and mask register 1. For one embodiment, a mask register bit set to 1 enables the corresponding bus bit, where as a mask register bit set to 0 disables, e.g. removes from consideration, the corresponding bus bit. For example, an 8-bit mask register with value, 00001111, would disable the 4 most significant bits of a corresponding 8-bit bus. Therefore, the 8-bit bus event, 10101010, would result in a masked pattern of XXXX1010, where X represents a disabled bit. The disabled bits are not considered when evaluating whether the data on the bus matches a preset breakpoint condition.

The masked bus data is next routed to the event detection logic 203. As with the mask logic 204, the event detection logic 203 is implemented in two blocks, equality comparator 0 304a and equality comparator 1 304b. Each equality comparator 304a, 304b tests for a specified breakpoint condition. Equality comparator 0 304a compares the selected and masked bus with the breakpoint condition specified in breakpoint register 0. Equality comparator 1 304b compares the selected and masked bus with the breakpoint condition specified in breakpoint register 1. For purposes of detection, a masked bit, represented above by an X, is a match by default. That is, an X matches both a 1 and a 0. If either bus event matches a breakpoint condition, the event detection logic 203 signals the breakpoint controller logic 201 that a match has been detected.

In an alternative embodiment, a single mask register could be used to mask a selected bus with a single pattern. The masked bus could be compared with multiple breakpoint conditions or a single breakpoint condition. Similarly, a single breakpoint condition register could be used, in which case, the single breakpoint condition could be compared to a single masked bus or to multiple masked busses. The use of multiple mask and breakpoint condition registers adds flexibility, but takes up space.

The breakpoint controller logic 201 is coupled to two 16-bit counters 305a and 305b. For one embodiment, the 16-bit counters 305a and 305b, in conjunction with the breakpoint control register 401, the two counter value registers 406 and 407, and the breakpoint controller logic 201 allow the breakpoint unit 103 to be configured to operate in one of several counter modes. A portion of the control register 401 is used to set the specific counter mode. In one mode, the breakpoint unit 103 is configured to generate a breakpoint event when the bus event specified in breakpoint condition register 0 402 is detected a number of times equal to the value programmed into counter value register 0 406. For example, if breakpoint condition register 0 402 is set to 01100110 and counter value register 0 406 is set to 4, when 16-bit counter 0 305a reaches 4, indicating that 01100110 has been detected 4 times, a breakpoint event will result. A second mode is the same as the first, but breakpoint condition register 1 403, counter value register 1 407, and 16-bit counter 1 305b are used.

In a third mode, a breakpoint event results when the bus pattern programmed in breakpoint condition register 0 402 is detected a number of times equal to the value programmed into counter value register 0 406 and the bus pattern programmed in breakpoint condition register 1 407 is detected a number of times equal to the value programmed into counter value register 1 407. In this mode, a breakpoint event results only when both counters 305a and 305b equal their respective counter values stored in the counter value registers 406 and 407. A fourth mode is similar to the third, except a breakpoint event results when either counter 305a or 305b reaches the value stored in its respective counter value register 406 or 407.

In a fifth mode, the breakpoint unit 103 is configured such that 16-bit counter 1 305a begins counting only after 16-bit counter 0 305b equals the value stored in counter value register 0 406. When 16-bit counter 1 305a equals the value in counter value register 1 407, a breakpoint event results. For example, if counter 0 305a and counter 1 305b are set to 3 and 2 respectively, counter 1 305a will begin counting only after counter 0 305b reaches 3, indicating that the bus pattern stored in breakpoint condition register 0 402 has been detected 3 times. When counter 1 305b reaches 2 and counter 0 305a is still equal to 3, a breakpoint event will result. A sixth mode is similar to the fifth only a breakpoint event will result when counter 1 305b reaches its respective counter value if counter 0 305a is equal to or greater than its respective counter value.

A final mode allows the breakpoint unit 103 to be configured such that a breakpoint event will result when counter 0 305a equals the value stored in counter value register 0 406, however, counter 0 305a is cleared each time counter 1 305b reaches the value stored in counter value register 1 407. For example, if counter value register 0 406 is set to 4 and counter value register 1 407 is set to 1, a breakpoint event will result only if the bus event stored in breakpoint condition register 0 402 is detected 4 consecutive times without 1 detection of the breakpoint condition specified in breakpoint condition register 1 403. Alternative modes may be defined using additional counters, counter value registers, and breakpoints. One skilled in the art understands how this could be extended to N registers and breakpoints.

The bus event capture interface 205 is coupled to a scratchpad RAM 102 as shown in FIG. 1. The scratchpad RAM 102 is a trace buffer for capturing and storing bus events before and after a breakpoint event. For one embodiment, the trace buffer is 128 bits wide by 512 deep. For one embodiment, the trace buffer is as wide as the widest bus coupled to the breakpoint unit 103. For one embodiment, the breakpoint unit 103 can be configured via configuration registers 400 to capture events on either the local processor bus 300 or the peripheral bus 301. When configured to monitor the peripheral bus 300, the breakpoint unit 103 can further be configured to capture all bus cycles, only valid bus cycles, cycles specific to a DMA (direct memory access) transfer, cycles involving local processor activity, or other types of bus cycles. When the breakpoint unit 103 is configured to monitor the local processor bus 301, it can be configured to capture all bus cycles, only valid bus cycles, all instruction fetches, all data transfers, or other types of cycles.

As discussed above, the breakpoint unit 103 can be configured to capture events both before and after a breakpoint event. For one embodiment, this is accomplished through the use of a capture cycle counter (not shown) and a capture cycle configuration register (not shown). For one embodiment, the breakpoint unit 103 continuously writes bus events to the trace buffer based on the selected cycle. For one embodiment, the trace buffer 128 is a ring buffer, in which a certain number of cycles are written, and when the buffer 128 is full, it starts re-writing at the top, overwriting the oldest data in the buffer.

The capture cycle configuration register is set with a value representing the number of cycles that are to be captured after a breakpoint event. When a breakpoint event occurs, the capture cycle counter is incremented once for every cycle captured until it reaches the number specified in the capture cycle configuration register. For one embodiment, the capture cycle counter is a 9-bit counter. Consequently, the breakpoint event's position within the trace buffer depends upon the value stored in the capture cycle configuration register.

For example, using a trace buffer 128 bits wide by 512 deep enables the capture of 512 bus cycles. Setting the capture cycle configuration register to 100 will result in 100 bus events being captured after the breakpoint event. This leaves a maximum of 411 bus events from before the breakpoint event in the trace buffer in addition to the breakpoint event itself. When capturing is enabled, the cycles are stored in the capture cycle configuration register, until the breakpoint. Thus, depending on how soon after the trace enable is turned on the breakpoint occurs, there may be one or more cycles prior to the breakpoint in the register. The number of cycles after the breakpoint are controlled by the capture configuration register. Increasing the value in the capture cycle configuration register increases the number of bus events that get stored after the breakpoint event and decreases the maximum number of bus events that are stored from before the breakpoint event. In this manner, a programmable number of bus cycles before and after the breakpoint event can be captured.

Figure 5:
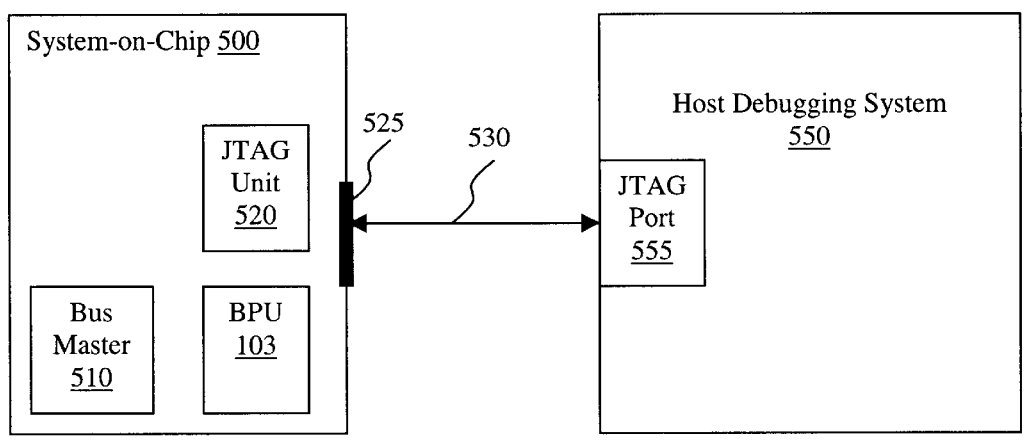
FIG. 5 is a block diagram of one embodiment of a multi-bus device with multi-bus breakpoint unit connected with a host debugging system.

FIG. 5 is a block diagram illustrating how the system-on-chip (SoC) 500 including the multi-bus breakpoint unit 103 can be used as part of a debugging system when it is coupled to a host debugging system 550. The breakpoint unit 103 is connected to multiple busses (not shown) as a slave device making it programmable by a master device 510 on any bus. Therefore, the breakpoint unit 103 can be programmed by any local processor or other master device 510, or by the host debugging system 550 coupled to the breakpoint unit 103. For one embodiment, the host debugging system 550 is coupled to the breakpoint unit 103 via an interface 525 on the chip. For one embodiment, interface 525 may be a serial port meeting the JTAG standard (IEEE Standard 1149.1). For one embodiment, SoC 500 may include a JTAG unit 520.

The JTAG unit 520 can access all addressable system resources by becoming the bus master on the internal bus of the SoC 500. Serving as a bus master, the JTAG unit 520, for one embodiment, converts serial bit streams into parallel registers whose contents are placed on the address, data and command buses to emulate bus transactions. The JTAG unit 520 serves as a bus slave when interacting with the memory access logic. Serving as a bus master, the JTAG unit 520 is able to set breakpoint events within the breakpoint unit 103, which is also a slave connected on the bus. The JTAG unit 520 is coupled via JTAG compliant interface 525 through a serial cable 530 to the JTAG port 555 of host debugging system 550.

Interfaces 525 of other types may be used to make the breakpoint unit 103 compatible with other host debugging systems 550.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A device comprising:
  a plurality of busses; and
  a breakpoint unit with a configuration logic, the breakpoint unit coupled to the plurality of busses and able to break on the detection of a specified bus event occurring on a selected bus, where the specified bus event and the selected bus are set by the configuration logic.

2. The device of claim 1 further comprising:
  an interface at which a host debugging system is coupled to the device.

3. The device of claim 2, wherein the interface complies with a JTAG standard.

4. The device of claim 1, further comprising:
  a scratchpad RAM coupled to the breakpoint unit to store bus events occurring before and after a breakpoint event.

5. The device of claim 1, wherein the configuration logic is dynamically programmed with a second specified bus event after the breakpoint unit has detected occurrence of a first specified bus event.

6. An integrated circuit comprising:
  a processor coupled to a local processor bus;
  a programmable logic coupled to a peripheral bus; and
  a programmable breakpoint unit with a configuration logic, the breakpoint unit coupled to the processor bus and the peripheral bus and able to break on the detection of a specified bus event on a selected bus, where the specified bus event and selected bus are set by the configuration logic.

7. The circuit of claim 6, further comprising:
  an interface to receive a host debugging system.

8. The circuit of claim 7 wherein the interface complies with a JTAG standard.

9. The circuit of claim 6 wherein the configuration logic is dynamically programmed with a second specified bus event on a second selected bus after the breakpoint unit has detected the occurrence of a first specified bus event.

10. The circuit of claim 6 wherein the breakpoint unit is further comprises:
  a bus select logic to select a bus from the local processor bus and the peripheral bus;
  an event detection logic to detect an occurrence of a specified bus event on the selected bus by comparing bus data read on the selected bus with the specified bus event; and
  a breakpoint controller logic to take control of the selected bus based on the detection of the specified bus event.

11. The circuit of claim 10, further comprising:
  a mask logic to mask the selected bus data with a masking pattern before the bus data is compared to the specified bus event.

12. The circuit of claim 6, further comprising:
  counters to track a number of occurrences of a breakpoint condition and to trigger the breakpoint controller unit after a preset number of the breakpoint conditions to declare a breakpoint event.

13. A breakpoint unit coupled to a plurality of busses comprising:
  a bus select logic to select a bus from a plurality of busses;
  a programmable configuration logic to configure the breakpoint unit to detect a specified bus event on the selected bus of the plurality of busses;
  an event detection logic to detect an occurrence of the specified bus event on the selected bus by comparing bits of the selected bus with the specified bus event.

14. The breakpoint unit of claim 13, further comprising:
  a breakpoint controller logic to take control of the selected bus based on the detection of the specified bus event.

15. The breakpoint unit of claim 13, wherein taking control of the selected bus comprises freezing a processor coupled to one of the plurality of busses.

16. The breakpoint unit of claim 13, further comprising:
  a mask logic to mask the selected bus data with a masking pattern before the bus data is compared to the specified bus event.

17. The breakpoint unit of claim 13, further comprising:

a counter logic to count a number of times the specified breakpoint condition occurs.

18. The breakpoint unit of claim 17, wherein the counter logic includes multiple counters, each counter associated with a breakpoint condition and able to count the number of times the breakpoint condition occurs.

19. The breakpoint unit of claim 17, wherein a breakpoint event occurs when the counter reaches a preset number.

20. The breakpoint unit of claim 13 wherein the bus select logic has a plurality of bus interfaces at which the plurality of busses are coupled to the breakpoint unit.

21. The breakpoint unit of claim 13 where the configuration logic is comprised of:

at least one programmable bus masking register to store bus masking. patterns;

at least one programmable breakpoint condition register to store the breakpoint condition; and at least one programmable counter value register to store a value representing a number of breakpoint conditions to be detected before a breakpoint event results.

22. A programmable breakpoint unit comprising:

a programmable configuration logic to configure the breakpoint unit to detect a specified bus event on a selected bus;

a bus select logic to select one bus from a plurality of busses, where the bus select logic has a plurality of bus interfaces at which the plurality of busses are coupled to the breakpoint unit;

an event detection logic to detect an occurrence of a specified bus event on the selected bus by comparing data on the selected bus with the specified bus event; and a breakpoint controller logic to take control of both busses when the event detection logic detects the specified bus event.

23. The breakpoint unit of claim 22 where the programmable configuration logic comprises:

at least one programmable control register to control the general functionality of the breakpoint unit;

at least one programmable bus masking register to store bus masking patterns;

at least one programmable breakpoint condition register to store a breakpoint condition; and at least one programmable counter value register to store a value representing a number of breakpoint conditions that are to be detected before a breakpoint event results.

24. A programmable breakpoint unit embedded in a device and coupled to a plurality of busses comprising:

means for selecting a bus from the plurality of busses coupled to the breakpoint unit;

means for detecting a specified bus event on the selected bus, means for breaking and taking control of the device when the occurrence of the specified bus event is detected.

25. A method of monitoring a device with multiple busses, said method comprising:

programming a configuration logic with a bus selection and a specified bus event;

selecting a bus from a plurality of busses coupled to a multi-bus breakpoint unit based on the bus selection programmed into the configuration logic;

for each bus event on the selected bus, comparing data on the selected bus with the bus event programmed into the configuration logic;

taking control of the device and the plurality of busses on occurrence of the specified bus event.

* * * * *